(12) United States Patent
Tanaka

(10) Patent No.: US 6,714,825 B1
(45) Date of Patent: Mar. 30, 2004

(54) MULTI-CHANNEL AUDIO REPRODUCING DEVICE

(75) Inventor: Yoshiichi Tanaka, Katano (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/434,481

(22) Filed: Nov. 5, 1999

(30) Foreign Application Priority Data

Nov. 12, 1998 (JP) .......................................... 10/322341

(51) Int. Cl.⁷ .............................................. G06F 17/00
(52) U.S. Cl. .......................................... 700/94; 386/99
(58) Field of Search ............................... 700/94; 381/18, 381/5–7, 80; 386/54, 67, 68, 85, 96, 99, 122

(56) References Cited

U.S. PATENT DOCUMENTS 5,963,153 A    10/1999  Rosefield et al.
5,986,589 A    11/1999  Rosefield et al.
6,122,382 A *   9/2000  Iida et al. ..................... 381/18
6,160,953 A * 12/2000  Fuchigama et al. ......... 386/105

FOREIGN PATENT DOCUMENTS

| EP | 0 896 498 | 2/1999 |
| JP | 11-053841 | 2/1999 |
| WO | 1999-364313 | 5/1997 |
| WO | 97 331005 | 2/1999 |

* cited by examiner

Primary Examiner—Rexford Barnie
(74) Attorney, Agent, or Firm—Wenderoth, Lind & Ponack, L.L.P.

(57) ABSTRACT

A multi-channel audio reproducing device of a type converting, from digital to analog, multi-channel audio data whose channels are different in sampling frequency by using DACs fewer in number than the channels, and reproducing the same. A decoding part executes sampling frequency conversion with respect to the audio data in at least one channel so that a sampling frequency thereof coincides with that of the other channels. A DAC part converts, from digital to analog in a time sharing manner, the audio data in the plurality of channels equalized in sampling frequency.

20 Claims, 8 Drawing Sheets

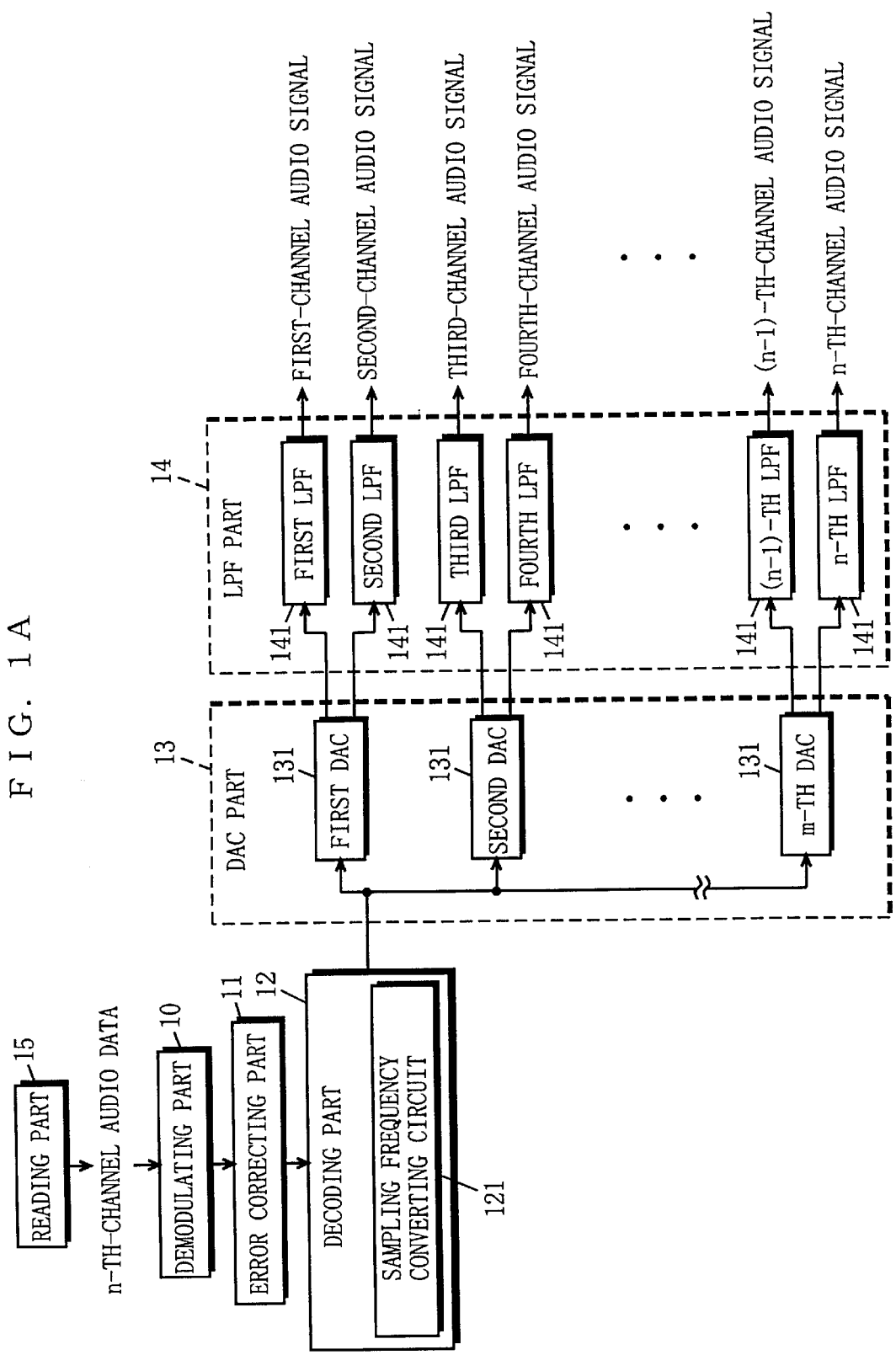

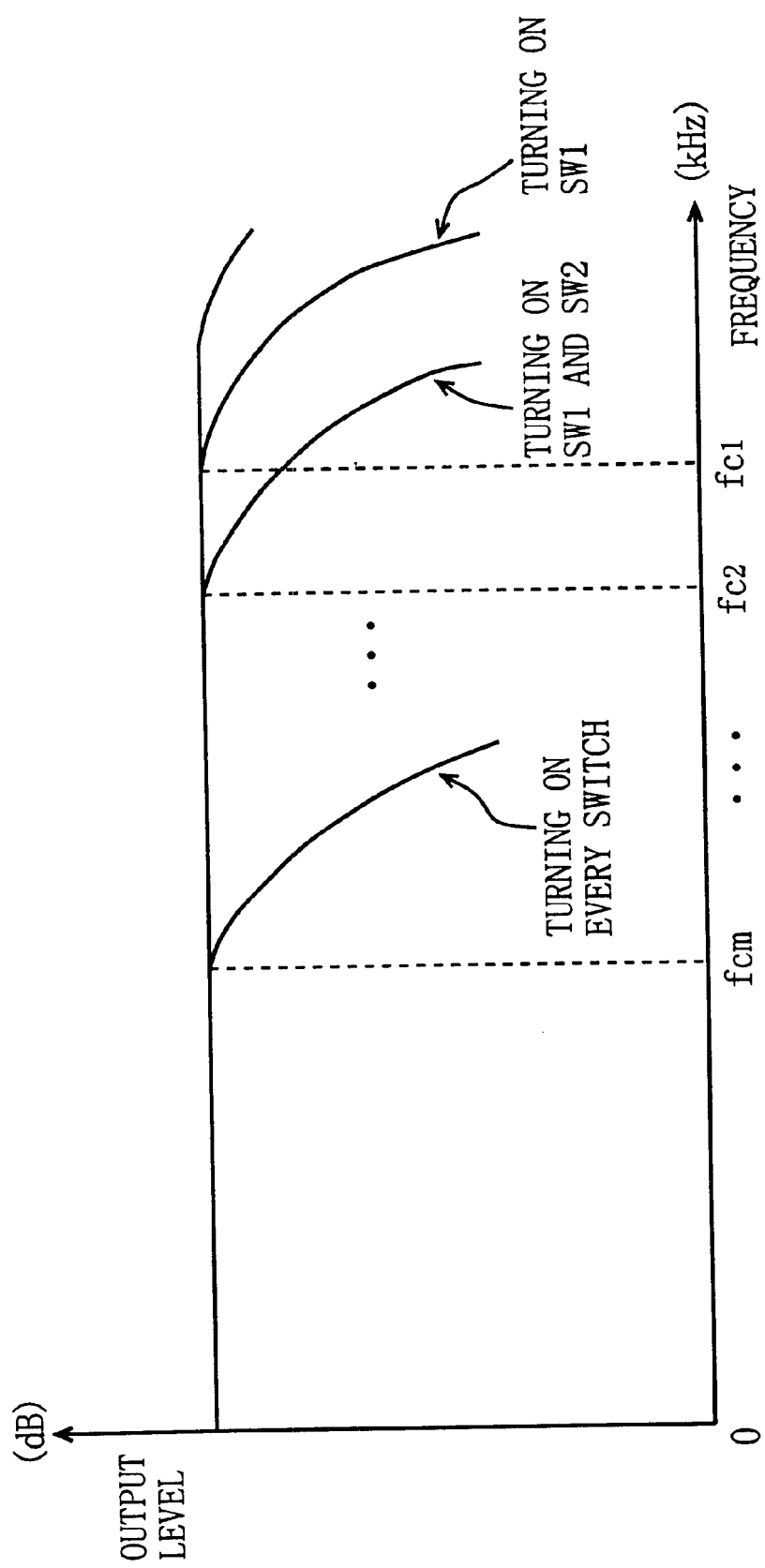

MULTI-CHANNEL AUDIO REPRODUCING DEVICE

BACKGROUND OF THE INVENTION

1. Field of the Invention

The present invention relates to multi-channel audio reproducing devices, and more particularly to a DVD audio reproducing device of a type reproducing DVD audio, that is, super hi-fi (High Fidelity) multi-channel audio recorded on a DVD.

2. Description of the Background Art

A digital versatile disc (DVD) is a recording medium originally developed for video, the capacity of which is more than six times as large as a compact disc (CD). Recording only audio on such large-capacity DVD allows multi-channel reproduction of super hi-fi audio.

By taking the CD as an example, 16-bit linear quantization is carried out at a sampling frequency of 44.1 kHz, realizing two-channel reproduction of audio having a reproduction frequency up to 22 kHz and a dynamic range of 98 dB. On the other hand, as to the DVD audio, by 24-bit linear quantization carried out at the sampling frequency of 96 kHz, for example, six-channel reproduction of audio having the reproduction frequency of 48 kHz and the dynamic range of 144 dB can be realized.

Quality and fidelity of reproduced audio generally mean a level of the upper limit of the reproduction frequency, the dynamic range, and flatness of the frequency characteristics. Hereinafter, the quality and fidelity of reproduced audio only mean the level of the upper limit of the reproduction frequency.

Standards of the DVD audio are still being defined for the practical use. Therefore, there is no conventional DVD audio reproducing device of a type reproducing the DVD audio. Accordingly, described below is a conventional DVD reproducing device used to reproduce video recorded on the DVD and audio accompanying therewith.

FIG. 5 is a block diagram showing the main part of a circuit in the conventional DVD reproducing device, where audio is reproduced.

What is reproduced by the device in FIG. 5 is video data recorded on the DVD and audio data accompanying therewith. The video data and audio data s are separately reproduced in a different processing circuit. It is thus not described herein how the video data is reproduced.

The audio data recorded on the DVD is audio obtained by, in accordance with MPEG2, for example, encoding and modulating digital audio data converted from analog audio picked up by a microphone, for example. The audio is in the form of multi-channel data (in this example, six-channel data).

Referring to FIG. 5, the audio data read from the DVD is provided for a demodulating part 50, and then is demodulated therein. An output of the demodulating part 50 is supplied to an error correcting part 51, then any error of which is corrected therein. An output of the error correcting part 51 is supplied to an audio decoding part 52.

The audio decoding part 52 decodes the provided audio data, and an output thereof is inputted into a DAC part 53.

The DAC part 53 is structured by a DAC (Digital Analog Converter), for example, and converts the inputted audio data in every channel from digital to analog through time-division processing. Alternatively, the DAC part 53 may be structured by three DACs and each DAC may convert the audio data in two channels, or by six DACs on a channel basis. Note that a fewer number of DACs is better in view of the device size and price if the processing speed of the DAC allows such a reduction.

An output of the DAC part 53 is supplied to an LPF part 54.

The LPF part 54 is structured by six low-pass filters (LPFs), and extracts any component equal to or lower than a predetermined frequency (so-called cutoff frequency) from an audio signal in the respective given channels so as to output the same as the 1st channel to 6th channel analog audio signals.

In this manner, the analog audio signals in the respective channels outputted from the conventional DVD reproducing device are amplified in a not-shown amplifier, and then are inputted into six speakers as shown in FIG. 6. Each of the speakers drives a diaphragm in response to the inputted analog audio signals so as to convert the signals into vibrations of air perceivable by user's ears, and then outputs the same.

FIG. 6 is a schematic diagram showing the structure and placement of a conventional speaker system being connected to the conventional DVD reproducing device in FIG. 5. In FIG. 6, the conventional speaker system includes a pair of main speakers 60, a pair of rear speakers 61, a center speaker 62, and a sub-woofer 63.

Assuming that the user sits at the center of a room, the pair of main speakers 60 are placed toward the front-left and front-right positions of the user, and the pair of rear speakers 61 are placed toward the back-left and back-right positions of the user. Moreover, placed between the pair of main speakers 60 is the center speaker 62, and the sub-woofer 63 is placed in a corner.

The center speaker 62 is a speaker mainly for mid-frequency ranges, and is provided to clearly reproduce vocals (human voice). The sub-woofer 63 is a (non-directional) speaker for low-frequency ranges, and enhances the reproduced audio in the ranges.

As is known from the above, the conventional DVD reproducing device shown in FIG. 5 has the capability of reproducing audio (multi-channel audio data) accompanying the video recorded on the DVD. As the DVD audio is regarded as the multi-channel audio data, the DVD audio reproducing device should be realized, on principle, by utilizing the capability.

Such a DVD audio reproducing device, however, bears the following problem (1).

(1) It is now under study, in the DVD audio specifications, whether or not channels can be different in sampling frequency. If channels vary in sampling frequency, all the best possible 5 use of the large-but-limited DVD capacity is enabled. If this is the case, however, it necessitates a number of the DACs as many as the number of channels. This is because, there is yet no such DAC that converts multi-channel audio data from digital to analog in a time sharing manner while switching the sampling frequency. Further, it is not easy to develop such a DAC. If the device is equipped with a number of the DACs as many as the numbers of channels, size and cost thereof will be enormous.

Moreover, in order to popularize the DVD audio reproducing device, it is important to give consideration to the following issue (2) while pursuing a high-end performance (that is, the attainable superlative performance).

(2) In order to make full use of the high-end performance feasible for the DVD audio, the whole audio system, inclusive of an amplifier and speaker, for example, needs to be high in performance as much as the DVD audio reproducing device. The problem is that, not every user owns such an amplifier or speaker, and these cost a lot together with the DVD audio reproducing device. Accordingly, many users are likely to connect a newly-purchased DVD audio reproducing device to their current or existing audio system for the time being. It is also likely for many users that the high-end performance is not what they are asking for but easy access to DVD audio with their current or existing audio system.

Therefore, it is desirable for the DVD audio reproducing device to be structurally connectable to the existing audio system such as the conventional speaker system shown in FIG. 6. In such case, the DVD audio reproducing device may not be high-end in performance, but can be easily accessible to high quality DVD audio in high quality.

SUMMARY OF THE INVENTION

Therefore, an object of the present invention is to provide a DVD audio reproducing device of a type converting DVD audio (multi-channel audio data), from digital to analog, having channels different in sampling frequency by using one or more DACs which are fewer in number than the channels, and then reproducing the converted DVD audio.

Another object of the present invention is to provide a DVD audio reproducing device of a type being structurally connectable to the existing audio system, and being easily accessible to the DVD audio only by connecting thereto.

The present invention has the following features to solve the problem above.

A first aspect of the present invention is directed to a multi-channel audio reproducing device for reproducing multi-channel audio data recorded on a recording medium and obtained by encoding audio data in a plurality of channels sampled at each different sampling frequency, the multi-channel audio reproducing device comprising:

a reading part for reading out the multi-channel audio data from the recording medium;

a decoding part for decoding the multi-channel audio data read by the reading part;

a DAC part for converting, from digital to analog, the audio data in each of the channels obtained after the decoding by the decoding part; and an LPF part for extracting, from an audio signal in each of the channels obtained after the D/A conversion by the DAC part, any component equal to or lower than a cutoff frequency which is assigned in accordance with a sampling frequency of each of the audio signals, and outputting the same as a analog audio signal for every channel, wherein:

the decoding part includes a sampling frequency converting part for executing sampling frequency conversion with respect to the audio data in at least one channel obtained by decoding so that a sampling frequency thereof coincides with that of the other channels; and the DAC part includes a digital analog converter converting, from digital to analog in a time sharing manner, the audio data in the plurality of channels equalized in sampling frequency through the sampling frequency conversion.

As described above, in the first aspect, such sampling frequency conversion is executed with respect to the audio data in at least one channel so that the sampling frequency thereof coincides with that of the other channels. In this manner, the audio data in the plurality of channels is equalized in sampling frequency and can be converted from digital to analog in the time sharing manner. Therefore, multi-channel audio data whose channels are different in sampling frequency can be converted, from digital to analog, by using the DACs fewer in number than the channels.

According to a second aspect, in the first aspect:

the LPF part includes variable low-pass filters in as many numbers as the channels of the multi-channel audio data, to which the audio signal in each of the channels obtained after the D/A conversion by the DAC part is inputted, and which have variable filtering characteristics of passing only a component equal to or lower than a cutoff frequency assigned to each of the audio and signals; and the decoding part includes a control part for controlling the filtering characteristics of each of the variable low-pass filters in relation-to the sampling frequency conversion.

As described above, in the second aspect, such sampling frequency conversion is carried out with respect to the audio data in at least one channel so that the sampling frequency thereof coincides with that of the other channels. Consequently, the sampling frequencies become fewer in selection, and so do the cutoff frequencies. Therefore, by using the low-pass filters having variable filtering characteristics, the filtering characteristics thereof can be controlled in an easier manner.

According to a third aspect, in the first aspect, the LPF part includes low-pass filters in as many numbers as the channels of the multi-channel audio data, to which the audio signal of each of the channels obtained after the D/A conversion by the DAC part is inputted, and which have unchanging filtering characteristics of passing only a component equal to or lower than the cutoff frequency assigned to each of the audio signals.

As described above, in the third aspect, such sampling frequency conversion is carried out with respect to the audio data in at least one channel so that the sampling frequency thereof coincides with that of the other channels. Consequently, the sampling frequencies become fewer in selection, and so do the cutoff frequencies. Therefore, the types of the filters can be reduced by using the low-pass filters having unchanging filtering characteristics.

According to a fourth aspect, in the first aspect, the sampling frequency converting part executes the sampling frequency conversion by interpolation when the sampling frequency is over-sampled, and by decimation when down-sampled.

As described above, in the fourth aspect, the sampling frequency conversion is done by interpolation/decimation. Thereofore, the sampling frequencies can be converted in an easier manner.

A fifth aspect of the present invention is directed to a DVD audio reproducing device for reproducing multi-channel audio data, recorded on a DVD, obtained by encoding audio data in a plurality of channels sampled at each different sampling frequency, the DVD audio reproducing device comprises:

a reading part for reading out the multi-channel audio data from the DVD;

a decoding part for decoding the multi-channel audio data read by the reading part;

a DAC part for converting, from digital to analog, the audio data in each of the channels obtained after the decoding by the DAC part; and an LPF part for extracting, from an audio signal in each of the channels obtained after the D/A conversion by the DAC part, any component equal to or lower than a cutoff frequency assigned in accordance with a sampling frequency of each of the audio signals, and outputting the same in the form of analog audio signal for every channel, wherein:

the decoding part includes a sampling frequency converting part for executing sampling frequency conversion with respect to the audio data in at least one channel obtained by decoding so that a sampling frequency thereof coincides with that of the other and channels; and the DAC part includes a digital analog converter converting, from digital to analog in a time sharing manner, audio data in the plurality of channels equalized in sampling frequency through the sampling frequency conversion.

As described above, in the fifth aspect, the sampling frequency conversion is carried out with respect to the audio data in at least one channel so that the sampling frequency thereof coincides with that of the other channels. In this manner, audio data in a plurality of channels equalized in sampling frequency can be converted from digital to analog in the time sharing manner. As a result, DVD audio (multi-channel audio data) whose channels are different in sampling frequency can be converted from digital to analog by using the DACs fewer in number than the channels.

A sixth aspect of the present invention is directed to a DVD audio reproducing device for reproducing six-channel audio data, recorded on a DVD, obtained by encoding audio data in six channels sampled at each different sampling frequency, the DVD audio reproducing device comprises:

a reading part for reading out the six-channel audio data from the DVD:

a decoding part for decoding the six-channel audio data read from the reading part;

a DAC part for converting, from digital to analog, the audio data in each of the channels obtained after the decoding by the decoding part; and an LPF part for extracting, from an audio signal in each of the channels obtained after the D/A conversion by the DAC part, any component equal to or lower than a cutoff frequency assigned in accordance with a sampling frequency of each of the audio signals, and outputting the same in the form of analog audio signal for every channel, wherein:

the decoding part includes a sampling frequency converting part for executing sampling frequency conversion with respect to the audio data in three channels obtained by decoding so that each sampling frequency thereof coincides with that of other three channels; and the DAC part includes three digital analog converters converting, from digital to analog in a time sharing manner, the audio data in two channels equalized in sampling frequency through the sampling frequency conversion.

As described above, in the sixth aspect, the sampling frequency conversion is executed with respect to the audio data in three channels so that each sampling frequency thereof coincides with that of the remaining three channels. In this manner, the two-channel audio data in three pairs equal in sampling frequency can be converted from digital to analog in the time sharing manner. As a result, DVD audio (six-channel audio data) whose channels are different in sampling frequency can be converted from digital to analog by using three DACs, and then reproduced.

Further, the device having a six-channel output is structurally connectable to the existing audio system. Therefore, the device can be connected thereto, and thus DVD audio is easily accessible. In this case, the high-end performance feasible for the DVD audio is not always available, but reproduced audio from the conventional system can be higher in audio quality.

Still further, all of the three DACs are provided with the capability of converting two-channel audio data from digital to analog in the time sharing manner. Therefore, the DAC does not require high-speed processing. Moreover, a recently-popular DAC is the type for the two-channel audio data. Therefore, using the type provides the device cost advantage.

According to a seventh aspect, in the sixth, aspect:

the LPF part includes six variable low-pass filters, to which the audio signal in each of the channels obtained after the D/A conversion by the DAC part is inputted, and which have variable filtering characteristics of passing only a component equal to or lower than a cutoff frequency assigned to each of the audio signals; and the decoding part, in relation to the sampling frequency conversion, includes a control part for controlling the filtering characteristics of each of the variable low-pass filters.

As described above, in the seventh aspect, the sampling frequency conversion is carried out with respect to the audio data in three channels so that each sampling frequency thereof coincides with that of the remaining three channels. As a result, the sampling frequencies become fewer in selection to three, and so do the cutoff frequencies. Therefore, by using the low-pass filters having variable filtering characteristics, the filtering characteristics can be controlled in a much easier manner.

According to an eighth aspect, in the sixth aspect, the LPF part includes six low-pass filters, to which the audio signal in each of the channels obtained after the D/A conversion by the DAC part is inputted, and which have unchanging filtering characteristics of passing only a component equal to or lower than the cutoff frequency assigned to each of the audio signals.

As described in the above, in the eighth aspect, the sampling frequency conversion is carried out with respect to the audio data in three channels so that each sampling frequency thereof coincides with that of the remaining three channels. As a result, the sampling frequencies become fewer in selection to three, and so do the cutoff frequencies. Therefore, the types of the filters can be reduced to half by using the low-pass filters having unchanging filtering characteristics.

According to a ninth aspect, in the sixth aspect, the sampling frequency converting part executes the sampling frequency conversion by interpolation when the sampling frequency is over-sampled, and by decimation when the sampling frequency is down-sampled.

As described above, in the ninth aspect, the sampling frequency conversion is carried out by interpolation/decimation. Therefore, the sampling frequencies can be converted in an easier manner.

A tenth aspect of the present invention is directed to a method of reproducing multi-channel audio obtained by encoding audio data in a plurality of channels sampled at each different sampling frequency, comprising:

a step of decoding the multi-channel audio data;

a step of converting, from digital to analog, the audio data in each of the channels obtained by decoding by the multi-channel audio data; and a step of extracting, from an audio signal in each of the channels obtained by decoding the multi-channel audio data, a component equal to or lower than a cutoff frequency assigned in accordance with a sampling frequency of each of the audio signals, and outputting the same in the form of analog audio signal for every channel, wherein:

in the decoding step, sampling frequency conversion is executed with respect to the audio data in at least one channel obtained by decoding so that a sampling frequency thereof coincides with that of the other channels; and in the D/A conversion step, the audio data in the plurality of channels equalized in sampling frequency through the sampling frequency conversion is converted from digital to analog in a time sharing manner.

An eleventh aspect of the present invention is directed to a recording medium on which a program for reproducing multi-channel audio data obtained by encoding audio data in a plurality of channels sampled at each different sampling frequency is recorded to be run in a computer device, the program for realizing an operational environment comprising:

a step of decoding the multi-channel audio data;

a step of converting, from digital to analog, the audio data in each of the channels obtained by decoding the multi-channel audio data; and a step of extracting, from an audio signal in each of the channels obtained by decoding the multi-channel audio data, a component equal to or lower than a cutoff frequency assigned in accordance with a sampling frequency of each of the audio signals, and outputting the same in the form of analog audio signal for every channel, wherein:

in the decoding step, sampling frequency conversion is executed with respect to the audio data in at least one channel obtained by decoding so that a sampling frequency thereof coincides with that of the other channels; and in the D/A conversion step, the audio data in the plurality of channels equalized in sampling frequency is converted from digital to analog in a time sharing manner through the sampling frequency conversion is recorded.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1A is a block diagram showing the main part of a multi-channel audio reproducing device according to a first embodiment of the present invention;

FIG. 2 is a diagram showing the internal structure of a variable LPF 141a plurally provided (n-piece) in an LPF part 14 in FIG. 1 as an alternative to an LPF 141, and a cutoff frequency switching control circuit 122 controlling the switching of the cutoff frequencies of the respective variable LPFs 141a;

FIG. 3 is a diagram showing the frequency characteristics of the variable LPF 141a in FIG. 2;

DESCRIPTION OF THE PREFERRED EMBODIMENTS

Figure 1B:
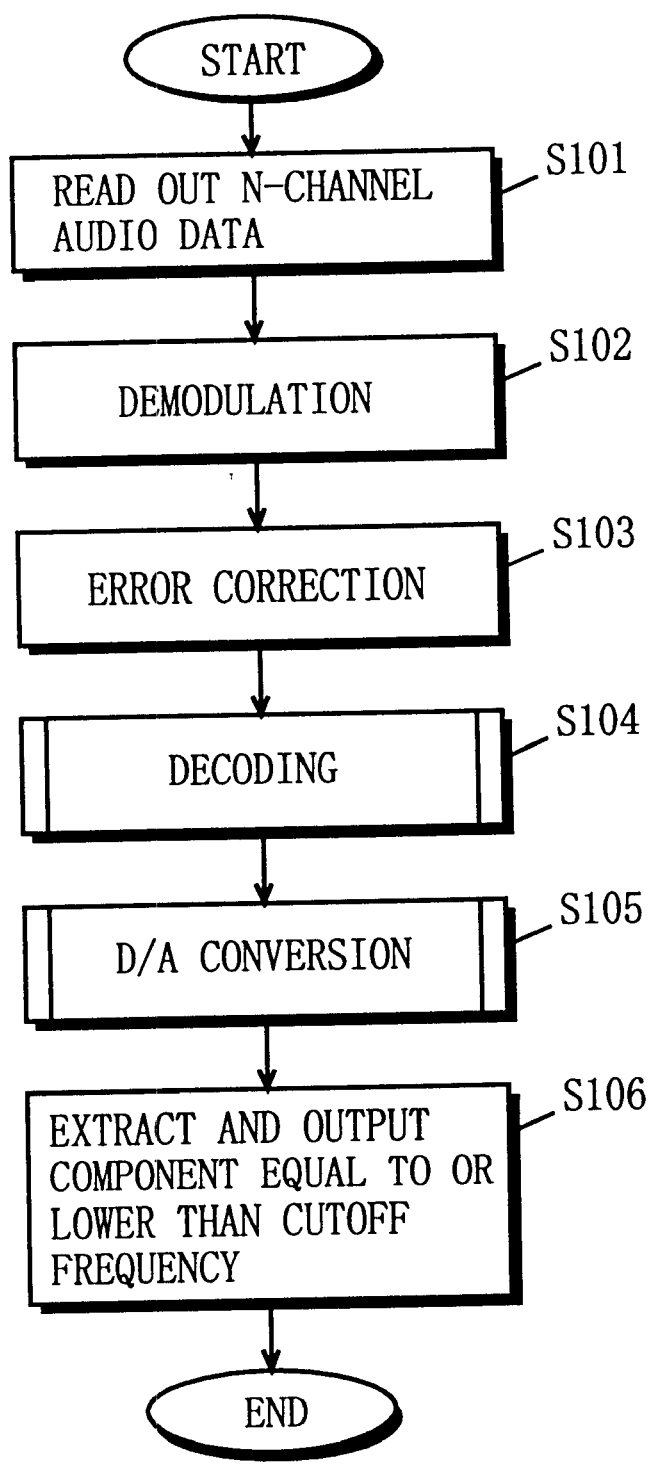
FIG. 1B is a flowchart illustrating an operation of the multi-channel audio reproducing device according to the first embodiment of the present invention.

The preferred embodiments of the present invention are described below with reference to the accompanying figures.

First Embodiment

FIG. 1A is a block diagram showing the main part of a multi-channel audio reproducing device according to a first embodiment of the present invention.

What is reproduced by the multi-channel audio reproducing device of the first embodiment is multi-channel audio data recorded on a predetermined recording medium. Such recording medium may be an optical disk including a DVD, a magnetic disk including an MD, or a magnetic tape including a DAT, for example. The multi-channel audio data in this example further includes the DVD audio (see Background Art).

Note that, according to the type of the recording medium, drive mechanism (not shown) for reading out data from the recording medium and data format, for example, vary. In any case, however, the main part in FIG. 1A shows no structural change. Further, the recording medium may include, associated with audio data, data other than audio, for example, image data or character data. Even in such case, the main part in FIG. 1A shows no structural change as the data other than audio is reproduced separately from the audio data in a dedicated circuit (not shown).

Described below is a case where n-channel audio data (where n is an arbitrary integer of 2 or more) recorded on a specific recording medium such as the DVD is reproduced. Note that, audio data in the respective channels (1st channel, 2nd channel, n-th channel) is digital data obtained by sampling at each different sampling frequency (fs1, fs2, . . . , fsn), and is encoded and modulated in a predetermined manner.

Such encoding is done according to MPEG2 for conventional DVD audio data, and 24-bit linear quantization for DVD audio, for example. The modulation is done by an EFM system, for example.

In FIG. 1A, the multi-channel audio reproducing device according to the first embodiment of the present invention is provided with a reading part 15, a demodulating part 10, an error correcting part 11, a decoding part 12, a DAC part 13, and an LPF part 14.

The reading part 15 reads out the n-channel audio data from the recording medium. The demodulating part 10 demodulates the read n-channel audio data. The error correcting part 11 corrects any error in output data from the demodulating part 10. The decoding part 12 decodes output data from the error correcting part 11. The DAC part 13 is structured by m (where m is an arbitrary integer satisfying $1 \leq m < n$) DAC(s) 131 (Digital Analog Converter), and converts output data from the decoding part 12 from digital to analog. The LPF part 14 is structured by n LPFs 141

(Low-Pass Filter) and extracts any frequency component equal to or lower than a predetermined frequency (cutoff frequency) from output signals from the DAC part 13 so as to output the same as analog audio signals.

The decoding part 12 includes a sampling frequency converting circuit 121, and the circuit converts (n−m)-channel audio data (where n denotes a number of channels which differ in sampling frequency and m denotes a predetermined number) so that a sampling frequency of each channel coincides with that of any m-channel. Conversion of the sampling frequency is done by interpolation when the sampling frequency is over-sampled (that is, when the sampling frequency is converted to be higher), and done by decimation when down-sampled (converted to be lower).

Through this sampling frequency conversion, the sampling frequencies in n selections (fs1, fs2, ..., fsn) are decreased to m selection(s) (fs1, fs2, ..., fsm). It means that m DAC(s) 131 is sufficient for the DAC part 13.

If one of the m DAC(s) 131 (1st DAC 131, 2nd DAC 131, ..., m-th DAC 131), for example, is provided with a capability of converting (n−m+1)-channel audio data from digital to analog in the time sharing manner, and if each of the remaining (m−1) DAC(s) 131 are/is provided with a capability of converting one-channel audio data from digital to analog, the n-channel audio data from the decoding part 12 can be converted from digital to analog by the m DAC(s) 131.

Most preferably, when n is an even number, each m DAC(s) 131 (where m=n/2) are/is provided with a capability of converting two-channel audio data from digital to analog in the timesharing manner, and when n is an odd number, each (m−1) DAC(s) 131 (where m=(n−1)/2) are/is provided with the capability similar to the above, and the remaining one DAC 131 is provided with the capability of converting one-channel audio data from digital to analog. This is because, D/A conversion in the time sharing manner for the two-channel audio data does not require high-speed processing as required for the (n−m+1)-channel audio data. Moreover, the recently-popular DAC 131 is the type for the two-channel audio data. Therefore, using the type provides the device cost advantage.

FIG. 1A shows a case where n is an even number and each m DAC (s ) 131 (where m=n/2) (1st to m-th DAC(s) 131) are/is provided with the capability of converting two-channel audio data from digital to analog in the time sharing manner.

As the sampling frequencies are decreased to m selection (s) (fs1, fs2, ..., fsm), n LPFs 141 varying in cutoff frequency such as fc1, fc2, ..., fsm (in other words, LPFs 141 in m-type) are sufficient for the LPF part 14. Alternatively, the LFP part 14 may have n variable LPFs (described later) which are capable of switching the cutoff frequencies in m-type such as fc1, fc2, ..., fcm among one another. If this is the case, however, the decoding part 12 is required to have a cutoff frequency switching control circuit (described later) so as to control the variable LPFs.

FIG. 1A shows a case where the LPF part 14 is provided with m-pair of LPFs 14, each pair of which has cutoff frequency of fc1, fc2, ..., fcm. To be more specific, the 1st and 2nd LPFs 141 are equal in cutoff frequency of fc1, and the 3rd and 4th are of fc2, ..., and the (n−1)th and n-th are of fcm.

It is now described how such multi-channel (n-channel) audio reproducing device is operated.

FIG. 1B is a flowchart illustrating an operation of the multi-channel audio reproducing device according to the first embodiment of the present invention.

In FIG. 1B, first of all, a user operates a switch (not shown) so as to activate the multi-channel audio reproducing device, and then sets a recording medium on which the n-channel audio data is recorded to a drive mechanism (not shown). Thereafter, the user pushes a button (not shown) so as to instruct the device to start reproduction. In response thereto, the drive mechanism is activated, and then rotates the recording medium. The reading part 15 then reads out the n-channel audio data from the rotating recording medium (step S101). The read n-channel audio data is inputted into the demodulating part 10.

Next, the demodulating part 10 demodulates the n-channel audio data (step S102), and output data of the demodulating part 10 is inputted into the error correcting part 11. Then, the error correcting part 11 corrects any error in the n-channel audio data (step S103). This error correction is done by a method of correcting errors using a Cross Interleave Read-Solomon Code (CRIC). Output data of the error correcting part 11 is inputted into the decoding part 12.

Thereafter, the decoding part 12 decodes the n-channel audio data (step S104). At this time, the sampling frequency converting circuit 121 provided in the decoding part 12 converts (n−m)-channel audio data (where n denotes the number of channels and m denotes a predetermined number), so that a sampling frequency of each channel (in this example, 1st to (n−m)th channel(s)) coincides with that of any m-channel. Through this sampling frequency conversion, the sampling frequencies in n selections are decreased to m selection(s). Output data of the decoding part 12 is inputted into the DAC part 13.

Then in the DAC part 13, the n-channel audio data is converted from digital to analog (step S105). The DAC part 13 is structured by m DAC(s) 131 (1st to m-th DAC(s) 131).

Assuming that one of them DAC (s) 131 (m-th DAC 131, in this example) is provided with the capability of converting (n−m+1)-channel audio data from digital to analog in the time sharing manner, and each of the remaining (m−1) DAC (s) 131 (1st to (m−1)th DAC (s ) 131, in this example) are/is provided with the capability of converting one-channel audio data from digital to analog, the aforementioned D/A conversion is carried out in the following manner.

In the DAC part 13, out of the n-channel audio data to be inputted, the 1st to (m−1)th DAC(s) 131 converts the 1st to (m−1)th-channel audio data from digital to analog, and the m-th DAC 131 converts the m-th to n-th-channel audio data from digital to analog in the time sharing manner.

When n is an even number, for example, each m DAC (s) 131 (where m=n12) (that is, 1st to m-th DAC 131(s)) are/is provided with the capability of converting two-channel audio data from digital to analog, the aforementioned D/A conversion is carried out in the following manner.

In the DAC part 13, out of the n-channel audio data to be inputted, each of the 1st to m-th DAC 131(s) converts two-channel audio data from digital to analog in the time sharing manner, such as the 1st and 2nd channels in pairs, ..., and the (n−1)th and n-th-channels in pairs.

On the other hand, when n is an odd number, each (m−1) DAC(s) 131 (where m=(n−1)/2) (in this example, 1st to (m−1)th DAC(s) 131) are/is provided with the capability of converting two-channel audio data from digital to analog in the time sharing manner, and the remaining one DAC 131 (the m-th DAC 131, in this example) is provided with the capability of converting one-channel audio data from digital to analog, the aforementioned D/A conversion is carried out in the following manner.

In the DAC part 13, out of the n-channel audio data to be inputted, the 1st to (m−1)th DAC(s) 131 converts two-channel audio data from digital to analog in the time sharing manner, such as the 1st and 2nd channels in pairs, . . . , and the (n−2)th and (n−1)th channels in pairs, and the m-th DAC 131 converts the n-channel audio data from digital to analog.

The output signals of the DAC part 13 are inputted into the LPF part 14, which has n LPFs 141 fixed in cutoff frequency (m-pair of LPFs 141, each pair of which has the cutoff frequency of fc1, fc2, . . . , fcm).

Thereafter, the LPF part 14 extracts any frequency component equal to or lower than the cutoff frequency (fc1, fc2, . . . , fcm) from the n-channel audio signals so as to output the same as the 1st to n-th channel analog audio signals (step S106).

The LPF part 14 may have n variable LPFs 141a being capable of switching cutoff frequencies in m selection(s) such as fc1, fc2, . . . , fcm among one another as an alternative to the n LPFs 141. In this case, the variable LPFs 141a are controlled in the following manner.

Figure 2:
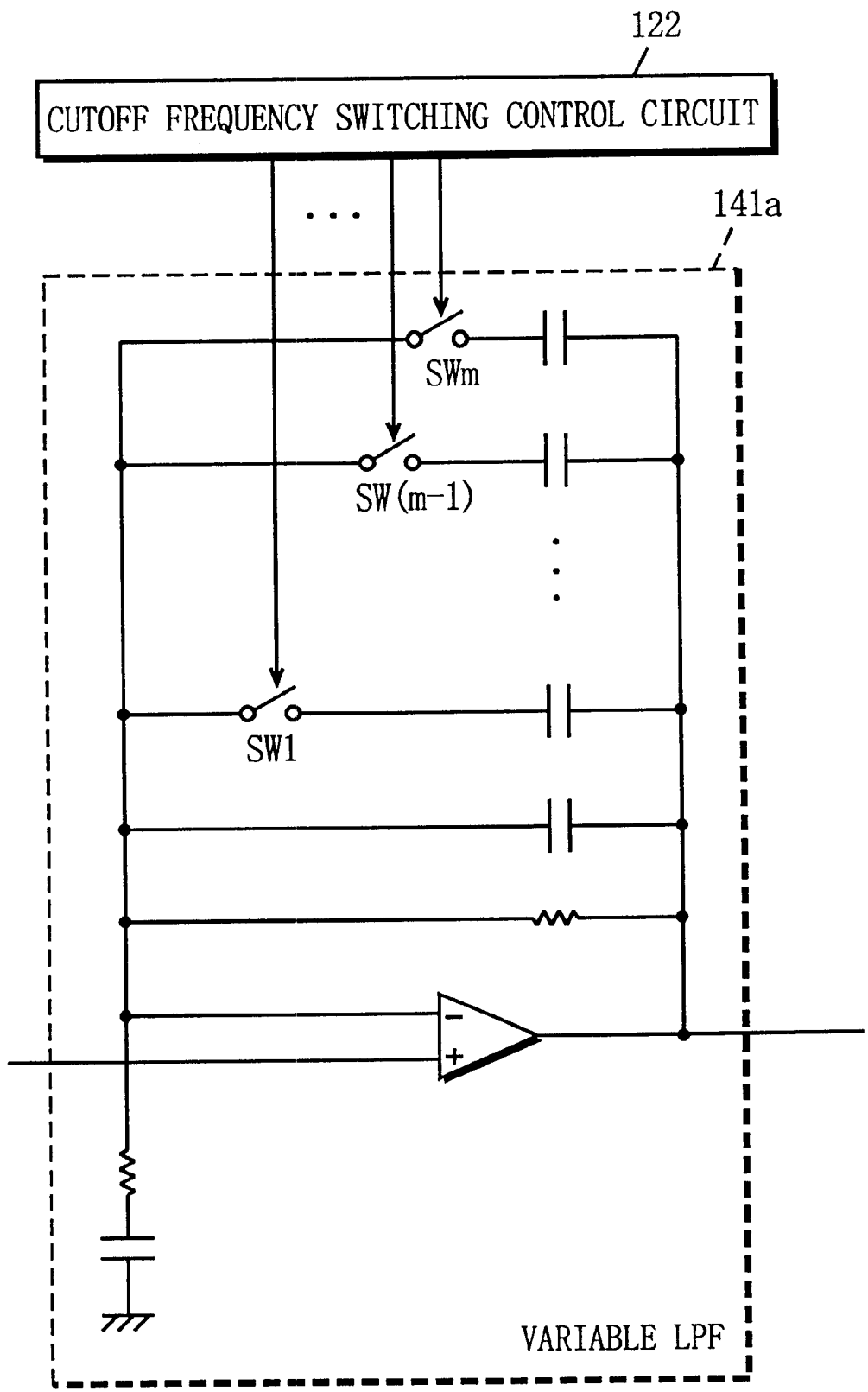

FIG. 2 is a diagram'showing the internal structure of the variable LPF 141a plurally provided (n-piece) in the LPF part 14 in FIG. 1 as an alternative to the LPF 141, and a cutoff frequency switching control circuit 122 controlling the switching of the cutoff frequencies of the respective variable LPFs 141a, and FIG. 3 is a diagram showing the frequency characteristics of the variable LPF 141a in FIG. 2.

In FIG. 2, the cutoff frequency switching control circuit 122 is provided in the decoding part 12, for example, and generates a control signal for switching the cutoff frequencies in m selection(s) such as fc1, fc2, . . . , fcm among one another in the variable LPFs 141a in relation to the sampling frequency conversion (that is, so as to match the cutoff frequencies with the sampling frequencies of the n-channel audio data after the conversion by the sampling frequency converting circuit 121). The variable LPFs 141a operate each switch (SW1, SW2, . . . , SW(m−1), SWm in the drawing) responding to the control signal from the cutoff frequency switching control circuit 122 so as to switch the cutoff frequencies.

To be specific, as: shown in FIG. 3, turning off the SW1 makes the cutoff frequency fc1, turning off the SW1 and SW2 makes the cutoff frequency fc2, . . . , and turning off every switch makes the cutoff frequency fc3.

Referring back to FIG. 1B, the 1st to n-th channel analog audio signals outputted from the multi-channel audio reproducing device in such manner are amplified in a not-shown multi-channel amplifier which is characteristically amplifying signals in a frequency range similar to that of the cutoff frequencies, and then are inputted into n speakers. Each of the speakers is characteristically capable of outputting audio in a frequency range similar to that of the cutoff frequencies, and thus drives a diaphragm in response to the inputted analog audio signals so as to convert the signals into vibrations of air perceivable by the user's ears, and then outputs the same.

Herein, the multi-channel audio reproducing device according to the first embodiment can be realized by a general-purpose computer system additionally provided with a drive device (not shown) for reading out data from a predetermined recording medium and a substrate for outputting audio having an LPF circuit thereon, for example. In such case, program memory of the computer system may store program data for reproducing the aforementioned multi-channel audio data. A CPU is operated in accordance with the program data, whereby the operational environment described by referring to FIG. 1B can be realized on the computer system.

Herein, there are three ways of storing program data into the program memory. First, read the program data from a recording medium on which the program data is recorded, and then store the data into the program memory. Second, receive the program data transmitted through a network, and store the received data into the program memory. Third, store the program data into the program memory prior to the shipment of the computer system.

As is known from the above, according to the first embodiment, the decoding part 12 executes the sampling frequency conversion with respect to audio data in at least one channel so that the sampling frequency thereof coincides with that of audio data in other channels. In this manner, the DAC part 13 can convert the audio data in a plurality of channels equal in sampling frequency from digital to analog in the time sharing manner. Accordingly, multi-channel audio data whose channels are different in sampling frequency can be converted, from digital to analog, by using the DAC(s) 131 fewer in number than the channels, and then reproduced.

It is described in the first embodiment that the sampling frequencies in the respective channels are fixedly assigned. The sampling frequencies, however, may be switched among one another if another channel switching circuit is provided between the decoding part 12 and the DAC part 13.

Second Embodiment

Figure 4A:
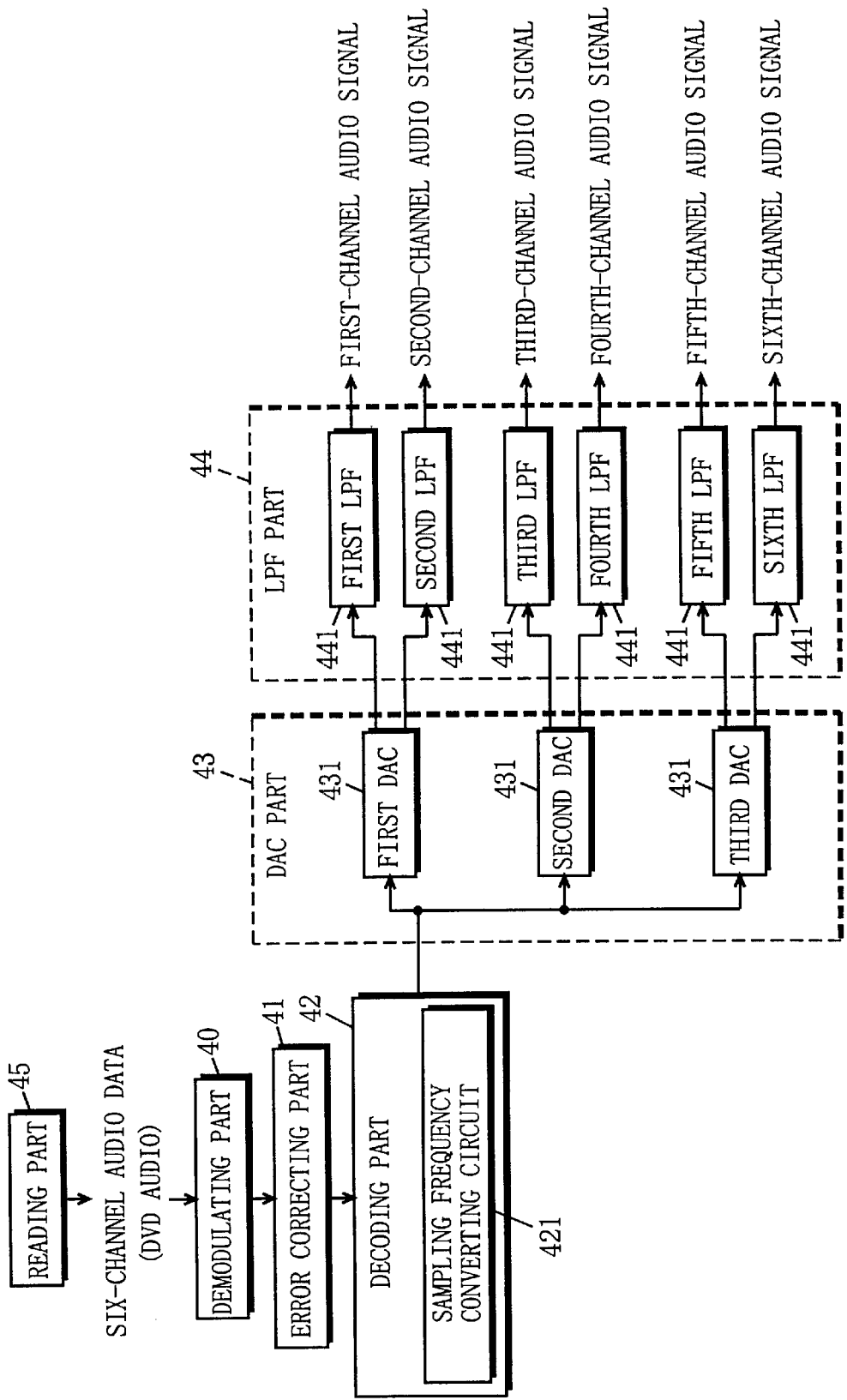
FIG. 4A is a block diagram showing the main part of a DVD audio reproducing device according to a second embodiment of the present invention.

FIG. 4A is a block diagram showing the main part of a DVD audio reproducing device according to a second embodiment of the present invention.

What is reproduced by the DVD audio reproducing device according to the second embodiment is six-channel audio data recorded on a DVD. Note that, audio data in the respective channels (1st channel, 2nd channel, . . . , 6th channel) is digital data obtained by sampling at each different sampling frequency (fs1, fs2, . . . , fs6), and is encoded and modulated in a predetermined manner. Such encoding is done by 24-bit linear quantization, and the modulation is done by an EFM system, for example.

In FIG. 4A, the DVD audio reproducing device according to the second embodiment is provided with a reading part 45, a demodulating part 40, an error correcting part 41, a decoding part 42, a DAC part 43, and an LPF part 44.

The reading part 45 reads out n-channel audio data from a recording medium. The demodulating part 40 demodulates the read six-channel audio data. The error correcting part 41 corrects any error in output data from the demodulating part 40. The decoding part 42 decodes output data from the error correcting part 41. The DAC part 43 is structured by three DACs 431 (Digital Analog Converters), and converts output data from the decoding part 42 from digital to analog. The LPF part 44 is structured by six LPFs 441 (Low-Pass Filters), and extracts any frequency component equal to or lower than a predetermined frequency (cutoff frequency) from output signals of the DAC part 43 so as to output the same as analog audio signals.

The decoding part 42 includes a sampling frequency converting circuit 421, and the circuit converts (6−3)-channel audio data (where 6 denotes the number of channels different in sampling frequency and 3 denotes a predetermined number) so that a sampling frequency of each channel coincides with that of any 3-channel. Conversion of the sampling frequency is done by interpolation when the sampling frequency is over-sampled (that is, when the sampling frequency is converted to be higher), and done by decimation when down-sampled (converted to be lower).

Through this sampling frequency conversion, the sampling frequency in six selections (fs1, fs2, . . . , fs6) is decreased to three selections (fs1, fs2 and fs3). It means that three DACs 431 are sufficient for the DAC part 43.

To be specific, one of the three DACs 431 (1st DAC 431, 2nd DAC 431, and 3rd DAC 431) is provided with a capability of converting four-channel audio data from digital to analog in a time sharing manner, and the remaining two DACs 431 are each provided with a capability of converting one-channel audio data from digital to analog. In this manner, the six-channel audio data from the decoding part 42 can be converted from digital to analog by three DACs 431.

Most preferably, each of the three DACs 431 is provided with a capability of converting two-channel audio data from digital to audio in the time sharing manner. This is because, D/A conversion in the time sharing manner for the two-channel audio data does not require high-speed processing as required for the four-channel audio data. Further, the recently-popular DAC 431 is the type for the two-channel audio data. Therefore, using the type provides the device cost advantage.

FIG. 4A shows a case where each of the three DACs 431 (1st to 3rd DACs 431) is provided with the capability of converting two-channel audio data from digital to analog in the time sharing manner.

As the sampling frequencies are decreased to three selections (fs1, fs2 and fs3), six LPFs 441 varying in cutoff frequency such as fc1, fc2 and fc3 (in other words, LPFs 441 in m-type) are sufficient for the LPF part 44. Alternatively, the LFP part 44 may have three variable LPFs (see FIGS. 2 and 3 as to the internal structure and the frequency characteristics thereof) which is capable of switching the cutoff frequencies in three selections such as fc1, fc2 and fc3 among one another. If this is the case, however, the decoding part 42 is required to have the cutoff frequency switching control circuit (see FIG. 2) so as to control the variable LPFs.

FIG. 4A shows a case where the LPF part 44 is provided with three-pair of LPFs 441, each pair of which has cutoff frequency of fc1, fc2, and fc3. To be more specific, the 1st and 2nd LPFs 441 are equal in cutoff frequency of fc1, and the 3rd and 4th are of fc2, and the 5th and 6th are of fc3.

It is now described how such DVD audio reproducing device is operated.

Figure 4B:
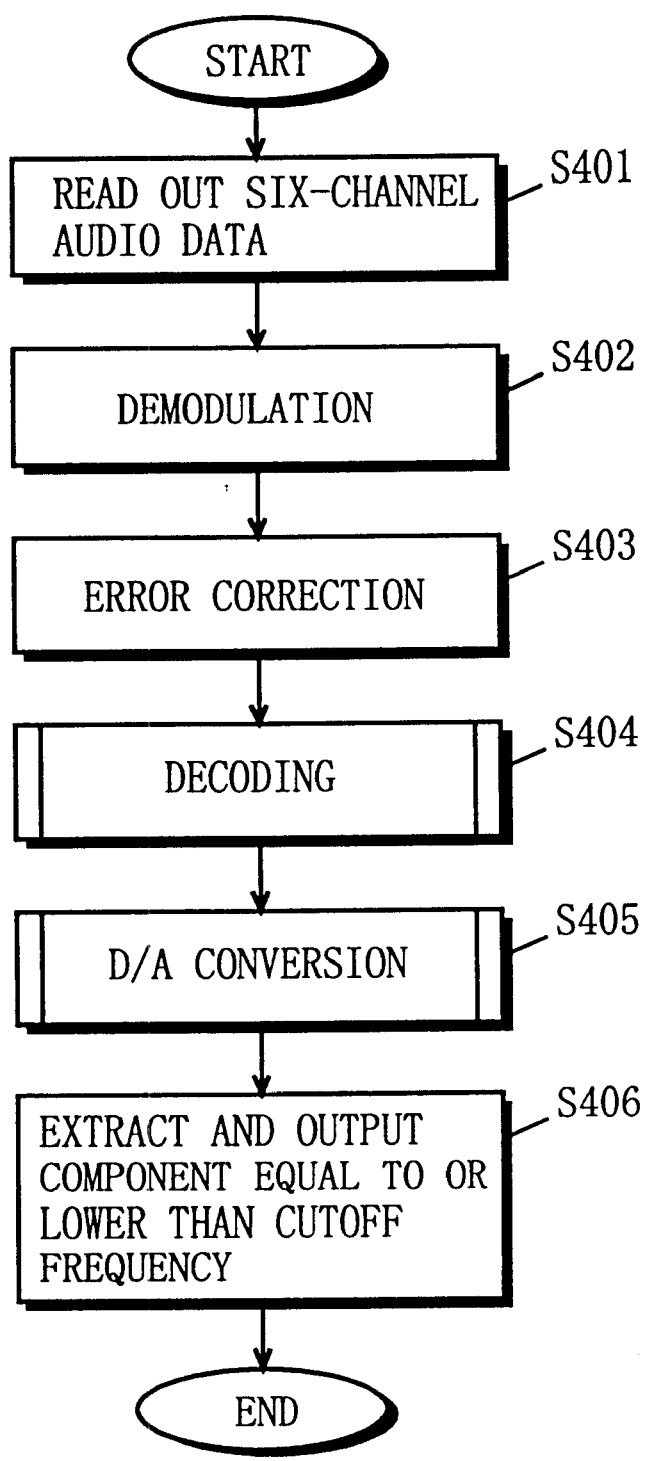
FIG. 4B is a flowchart illustrating an operation of the DVD audio reproducing device according to the second embodiment of the present invention.
Figure 5:
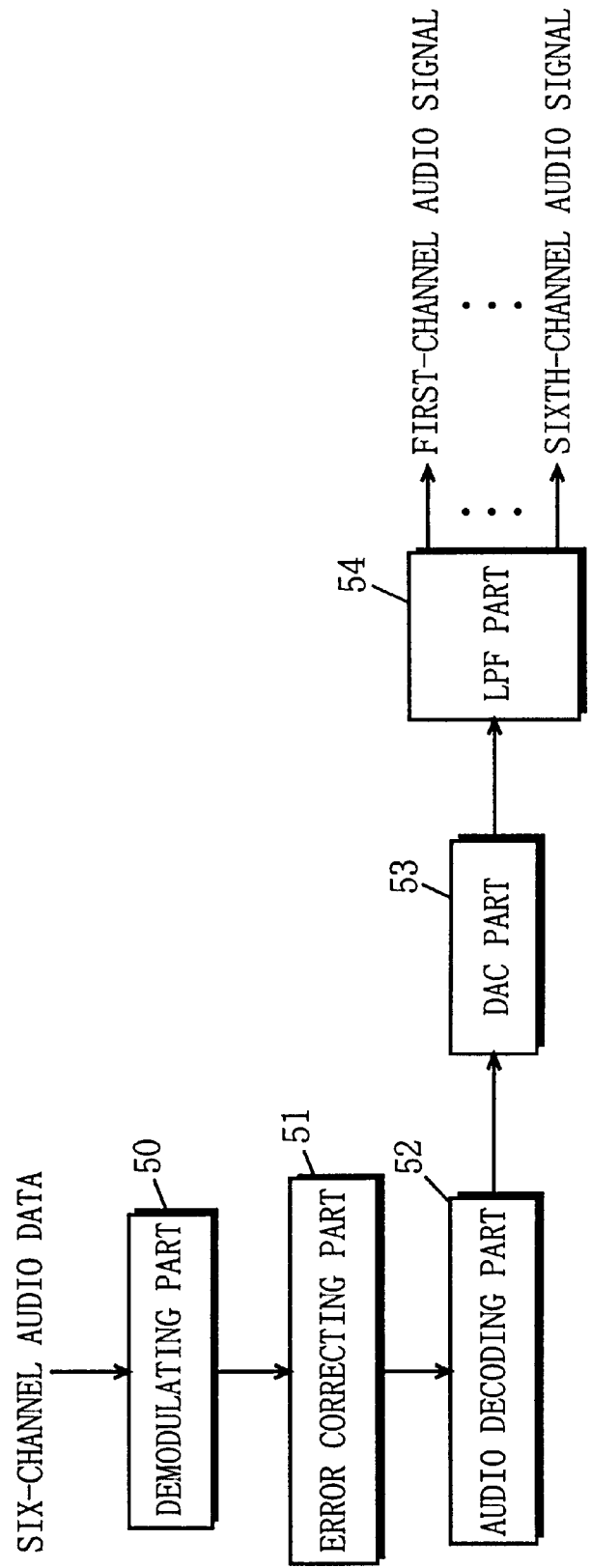
FIG. 5 is a block diagram showing the main part of a circuit in a conventional DVD reproducing device, where audio is reproduced.

FIG. 4B is a flowchart illustrating an operation of the DVD audio reproducing device according to the second embodiment of the present invention.

In FIG. 4B, first of all, a user operates a switch (not shown) so as to activate the multi-channel audio reproducing device, and then sets a DVD on which. DVD audio (six-channel audio data) is recorded to a drive mechanism (not shown). Thereafter, the user pushes a button (not shown) so as to instruct the device to start reproduction. In response thereto, the drive mechanism is activated, and then rotates the DVD. The reading part 45 reads out the six-channel audio data from the rotating DVD (step S401). The read six-channel audio data is inputted into the demodulating part 40.

Next, the demodulating part 40 demodulates the six-channel audio data (step S402), and output data of the demodulating part 40 is inputted into the error correcting part 41. Then, the error correcting part 41 corrects any error in the six-channel audio data (step S403). The error correction is done by a method of correcting errors using a Cross Interleave Read-Solomon Code (CRIC), for example. Output data of the error correcting part 41 is inputted into the decoding part 42.

Thereafter, the decoding part 42 decodes the six-channel audio data (step S404). At this time, the sampling frequency converting circuit 421 provided in the decoding part 42 converts (6−3)-channel audio data (where 6 denotes the number of channels and 3 denotes a predetermined number) so that a sampling frequency of each channel (in this example, 1st to 3rd-channel audio data) coincides with that of any 3-channel (in this example, 4th to 6th-channel audio data). Through this sampling frequency conversion, the sampling frequencies in six selections are decreased to three selections. Output data of the decoding part 42 is inputted into the DAC part 43.

Then, in the DAC part 42, the six-channel audio data is converted from digital to analog (step S405). The DAC part 43 is structured by three DACs 431 (1st to 3rd DAC 431).

Assuming that one of the three DACs 431 (3rd DAC 431 in this example) is provided with the capability of converting four-channel audio data from digital to analog in the time sharing manner, and the remaining two DACs 431 (1st and 2nd DACs 431 in this example) are each provided with the capability of converting one-channel audio data from digital to analog, the aforementioned D/A conversion is carried out in the following manner.

In the DAC part 43, out of the six-channel audio data to be inputted, the 1st to 3rd DAC 131s each converts two-channel audio data from digital to analog in the time sharing manner, such as the 1st and 2nd channels in pairs, the 3rd and 4th channels in pairs, and the 5th and 6th channels in pairs.

The output signals of the DAC part 43 are inputted into the LPF part 44, which has six LPFs 141 fixed in cutoff frequency (3-pair of LPFs 141, each pair of which has the cutoff frequency of fc1, fc2 and fc3).

Thereafter, the LPF part 44 extracts any frequency component equal to or lower than the cutoff frequency (fc1, fc2 and fc3) from the six-channel audio signals so as to output the same as the 1st to 6th channel analog audio signals (step S406).

The LPF part 44 may have six variable LPFs 141a being capable of switching the cutoff frequencies in three selections such as fc1, fc2 and fc3 among one another as an alternative to the six LPFs 441 (note that, see FIG. 2 as to the internal structure of the variable LPF 141a, and FIG. 3 as to the frequency characteristics thereof; where n=6 and m=3). In this case, the variable LPFs 141a are controlled in the following manner.

In FIG. 2, the cutoff frequency switching control circuit 122 is provided in the decoding part 42, for example, and generates a control signal for switching the cutoff frequencies in three selections such as fc1, fc2 and fc3 among one another in the variable LPFs 141a in relation to the sampling frequency conversion (that is, so as to match the cutoff frequencies with the sampling frequencies of the six-channel audio data after the conversion by the sampling frequency converting circuit 421). The variable LPFs 141a operate each switch (SW1 to SW3 in the drawing) responding to the control signal from the cutoff frequency switching control circuit 122 so as to switch the cutoff frequencies.

To be specific, as shown in FIG. 3, turning off the SW1 makes the cutoff frequency fc1, turning off the SW1 and SW2 makes the cutoff frequency fc2, and turning off every switch makes the cutoff frequency fc3.

Referring back to FIG. 4B, the 1st to 6th channel analog audio signals outputted from the DVD audio reproducing device in such manner are amplified in a not-shown six-channel amplifier which is characteristically amplifying signals in a frequency range similar to that of the cutoff frequencies, and then are inputted into six speakers. Each of the speakers is characteristically capable of outputting audio in a frequency range similar to that of the cutoff frequencies, and thus drives a diaphragm in response to the inputted analog audio signals so as to convert the signals into vibrations of air perceivable by the user's ears, and then outputs the same.

Figure 6:
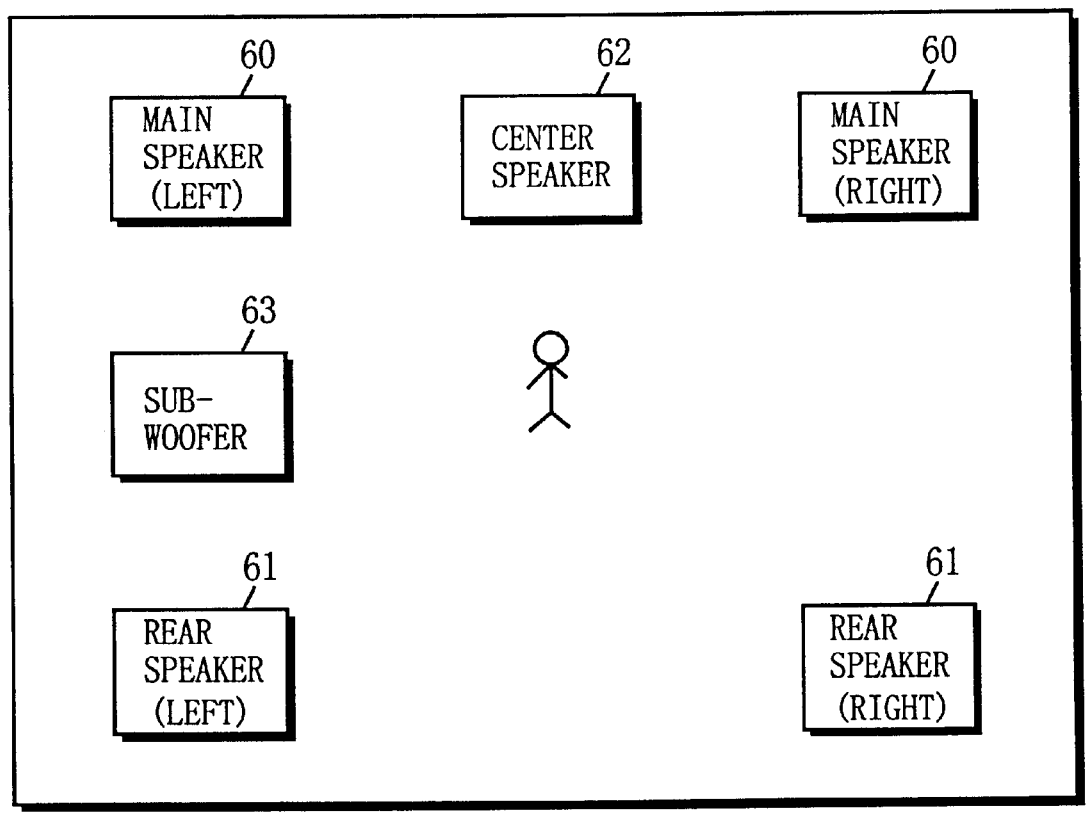
FIG. 6 is a schematic diagram showing the structure and placement of a conventional speaker system which is connected to the conventional DVD reproducing device shown in FIG. 5.

Herein, an output of the DVD audio reproducing device is in the form of six-channel analog audio signals suitable for the existing audio system such as the speaker system shown in FIG. 6. Therefore, the DVD audio reproducing device can be connected to the existing audio system. In such case, the high-end performance is not available, but DVD audio in higher quality is easily accessible.

Herein, the multi-channel audio reproducing device according to the second embodiment can be realized by a general-purpose computer system additionally provided with a drive device (not shown) for reading out data from a DVD and a substrate for outputting audio having an LPF circuit thereon, for example. In such case, program memory of the computer system may store program data for reproducing the aforementioned six-channel audio data. A CPU is operated in accordance with the program data, whereby the operation environment described by referring to FIG. 4B can be realized on the computer system.

There are three ways of storing program data into the program memory. First, read program data from a recording medium on which the program data is recorded, and then store the data into the program memory. Second, receive the program data transmitted through a network, and store the received data into the program memory. Third, store the program data into the program memory prior to the shipment of the computer system.

As is known from the above, according to the second embodiment, the decoding part 42 executes the sampling frequency conversion with respect to audio data in at least one channel so that the sampling frequency thereof coincides with that of audio data in other channels. In this manner, the DAC part 43 can convert the audio data in a plurality of channels equal in sampling frequency from digital to analog in the time sharing manner. Accordingly, DVD audio data (six-channel audio data) whose channels are different in sampling frequency can be converted, from digital to analog, by using the DAC(s) 431 fewer in number than the channels, and then reproduced.

It is described in the second embodiment that the sampling frequencies in the respective channels are fixedly assigned. The sampling frequencies, however, may be switched among one another if another channel switching circuit is provided between the decoding part 42 and the DAC part 43.

Third Embodiment

In the third embodiment of the present invention, the sampling frequencies in the second embodiment are exemplarily assigned specific values of fs1=44.1 kHz, fs2=88.2 kHz, and fs3=176.4 kHz. In accordance therewith, the cutoff frequencies are exemplarily assigned such as fc1=25 kHz, fc2=50 kHz, and fc3=100 kHz. Specifically, the sampling frequencies in six selections (fs1, fs2, ..., fs6) are decreased to three selections (44.1 kHz, 88.2 kHz, and 176.4 kHz) through the sampling frequency conversion. In this manner, a DVD audio reproducing device suitable for the conventional speaker system shown in FIG. 6 can be realized.

To be more specific, by placing the six speakers as shown in FIG. 6 (so-called surround placement), audio signals to the six speakers are not necessarily in the same level of quality (herein, quality means a level of an upper limit of the reproduction frequency band range). This is because, in FIG. 6, the sub-woofer 63 is only for reproducing audio in the low-frequency ranges, and placing the rear speakers 61 is only for adding a sense of realism to the audio from the main speakers 60 by taking a directivity of the user's sense of hearing into consideration, for example.

Accordingly, the analog audio signals from the 5th and 6th channels (corresponding to the sampling frequency of 176.4 kHz) are provided for the pair of main speakers 60, and signals from the 3rd and 4th channels (88.2 kHz) are to the pair of rear speakers 61, and signals from the 1st and 2nd channels (44.1 kHz) are to the center speaker 62/sub-woofer 63.

As is known from the above, according to the third embodiment, audio quality of reproduced audio from the conventional speaker system in FIG. 6 can be maximized.

Further, components for the DAC or LPF which are widely used for the sampling frequency of 44.1 kHz can be used to the DVD audio reproducing device. Therefore, using the type provides the device cost advantage.

Note that, it is also effective to the same extent with fs1=48 kHz, fs2=96 kHz, and fs3=192 kHz and, accordingly, fc1=25 kHz, fc2=50 kHz, and fc3=100 kHz.

Fourth Embodiment

In the fourth embodiment of the present invention, the sampling frequencies in the third embodiment are exemplarily assigned specific values of fs4=44.1 kHz, fs5=88.2 kHz, and fs6=176.4 kHz. To be specific, out of the six-channel audio data recorded on the DVD, the 1st and 2nd-channel audio data is data obtained by sampling at a sampling frequency of 44.1 kHz, the 3rd and 4th-channel audio data is data sampled at a sampling frequency of 88.2 kHz, and the 5th and 6th-channel audio data is data sampled at a sampling frequency of 176.4 kHz.

In this case, the DVD audio reproducing device is not required to convert the sampling frequency therein. Therefore, size of the device is reduced, and accordingly cost thereof is lowered.

Note that, when fs1=48 kHz, fs2=96 kHz, and fs3=192 kHz, fs4, fs5, and fs6 may be assigned 48 kHz, 96 kHz, and 192 kHz, respectively.

While the invention has been described in detail, the foregoing description is in all aspects illustrative and not restrictive. It is understood that numerous other modifications and variations can be devised without departing from the scope of the invention.

What is claimed is:

1. A multi-channel audio reproducing device for reproducing multi-channel audio data recorded on a recording medium and obtained by encoding audio data in a plurality of channels sampled at different sampling frequencies, said multi-channel audio reproducing device comprising:

a reading means for reading out the multi-channel audio data from the recording medium;

a decoding means for decoding the multi-channel audio data read by said reading means;

a DAC means for converting, from digital to analog, the audio data in each of the channels obtained after the decoding by said decoding means; and an LPF means for extracting, from an audio signal in each of the channels obtained after the D/A conversion by said DAC means, any component equal to or lower than a cutoff frequency which is assigned in accordance with a sampling frequency of each of the audio signals, and outputting the same as an analog audio signal for every channel;

wherein said decoding means includes a sampling frequency converting means for executing sampling frequency conversion with respect to the audio data in at least one channel obtained by the decoding so that a sampling frequency thereof coincides with that of the other channels; and wherein said DAC means includes a digital to analog converter for converting, from digital to analog in a time sharing manner, the audio data in the plurality of channels equalized in sampling frequency through the sampling frequency conversion.

2. The multi-channel audio reproducing device according to claim 1, wherein said LPF means includes variable low-pass filters in as many numbers as the channels of the multi-channel audio data, to which the audio signal in each of the channels obtained after the D/A conversion by said DAC means is inputted, and which have variable filtering characteristics of passing only a component equal to or lower than a cutoff frequency assigned to each of the audio signals; and wherein said decoding means includes a control means for controlling the variable filtering characteristics of each of the variable low-pass filters in relation to the sampling frequency conversion.

3. The multi-channel audio reproducing device according to claim 1, wherein said LPF means includes low-pass filters in as many numbers as the channels of the multi-channel audio data, to which the audio signal of each of the channels obtained after the D/A conversion by said DAC means is inputted, and which have unchanging filtering characteristics of passing only a component equal to or lower than the cutoff frequency assigned to each of the audio signals.

4. The multi-channel audio reproducing device according to claim 1, wherein said sampling frequency converting means executes the sampling frequency conversion by interpolation when the sampling frequency is over-sampled, and by decimation when down-sampled.

5. A DVD audio reproducing device for reproducing multi-channel audio data, recorded on a DVD, obtained by encoding audio data in a plurality of channels sampled at different sampling frequencies, said DVD audio reproducing device comprising:

a reading means for reading out the multi-channel audio data from the DVD;

a decoding means for decoding the multi-channel audio data read by said reading means;

a DAC means for converting, from digital to analog, the audio data in each of the channels obtained after the decoding by said DAC means; and an LPF means for extracting, from an audio signal in each of the channels obtained after the D/A conversion by said DAC means, any component equal to or lower than a cutoff frequency assigned in accordance with a sampling frequency of each of the audio signals, and outputting the same in a form of an analog audio signal for every channel;

wherein said decoding means includes a sampling frequency converting means for executing sampling frequency conversion with respect to the audio data in at least one channel obtained by the decoding so that a sampling frequency thereof coincides with that of the other channels; and said DAC means includes a digital to analog converter for converting, from digital to analog in a time sharing manner, audio data in the plurality of channels equalized in sampling frequency through the sampling frequency conversion.

6. A DVD audio reproducing device for reproducing six-channel audio data, recorded on a DVD, obtained by encoding audio data in six channels sampled at different sampling frequencies, said DVD audio reproducing device comprising:

a reading means for reading out the six-channel audio data from the DVD:

a decoding means for decoding the six-channel audio data read from said reading means;

a DAC means for converting, from digital to analog, the audio data in each of the channels obtained after the decoding by said decoding means; and an LPF means for extracting, from an audio signal in each of the channels obtained after the D/A conversion by said DAC means, any component equal to or lower than a cutoff frequency assigned in accordance with a sampling frequency of each of the audio signals, and outputting the same in a form of an analog audio signal for every channel;

wherein said decoding means includes a sampling frequency converting means for executing sampling frequency conversion with respect to the audio data in three channels obtained by the decoding so that each sampling frequency thereof coincides with that of three other channels; and said DAC means includes three digital to analog converters for converting, from digital to analog in a time sharing manner, the audio data in three channels equalized in sampling frequency through the sampling frequency conversion.

7. The DVD audio reproducing device according to claim 6, wherein said LPF means includes six variable low-pass filters, to which the audio signal in each of the channels obtained after the D/A conversion by said DAC means is inputted, and which have variable filtering characteristics of passing only a component equal to or lower than a cutoff frequency assigned to each of the audio signals; and wherein said decoding means, in relation to the sampling frequency conversion, includes a control means for controlling the variable filtering characteristics of each of said six variable low-pass filters.

8. The DVD audio reproducing device according to claim 6, wherein said LPF means includes six low-pass filters, to which the audio signal in each of the channels obtained after the D/A conversion by said DAC means is inputted, and which have unchanging filtering characteristics of passing only a component equal to or lower than the cutoff frequency assigned to each of the audio signals.

9. The DVD audio reproducing device according to claim 6, wherein said sampling frequency converting means executes the sampling frequency conversion by interpolation when the sampling frequency is over-sampled, and by decimation when the sampling frequency is down-sampled.

10. A method of reproducing multi-channel audio obtained by encoding audio data in a plurality of channels sampled at different sampling frequencies, said method comprising:

decoding the multi-channel audio data;

converting, from digital to analog, the audio data in each of the channels obtained by decoding the multi-channel audio data; and extracting, from an audio signal in each of the channels obtained by decoding the multi-channel audio data, a component equal to or lower than a cutoff frequency assigned in accordance with a sampling frequency of each of the audio signals, and outputting the same in a form of an analog audio signal for every channel;

wherein in said decoding, sampling frequency conversion is executed with respect to the audio data in at least one channel obtained by decoding so that a sampling frequency thereof coincides with that of the other channels; and wherein in said converting, the audio data in the plurality of channels equalized in sampling frequency through the sampling frequency conversion is converted from digital to analog in a time sharing manner.

11. A recording medium on which a program for reproducing multi-channel audio data obtained by encoding audio data in a plurality of channels sampled at different sampling frequencies is recorded to be executed in a computer device, the program for realizing an operational environment causing the computer device to perform a method comprising:

decoding the multi-channel audio data;

converting, from digital to analog, the audio data in each of the channels obtained by decoding the multi-channel audio data; and extracting, from an audio signal in each of the channels obtained by decoding the multi-channel audio data, a component equal to or lower than a cutoff frequency assigned in accordance with a sampling frequency of each of the audio signals, and outputting the same in a form of an analog audio signal for every channel;

wherein in said decoding, sampling frequency conversion is executed with respect to the decoded audio data in at least one channel so that a sampling frequency thereof coincides with that of the other channels; and wherein in said converting, the audio data in the plurality of channels equalized in sampling frequency through the sampling frequency is converted from digital to analog in a time sharing manner.

12. A multi-channel audio reproducing device for reproducing multi-channel audio data recorded on a recording medium and obtained by encoding audio data in a plurality of channels sampled at different sampling frequencies, said multi-channel audio reproducing device comprising:

a reading part operable to read out the multi-channel audio data from the recording medium;

a decoding part operable to decode the multi-channel audio data read by said reading part;

a DAC part operable to convert, from digital to analog, the audio data in each of the channels obtained after the decoding by said decoding part; and an LPF part operable to extract, from an audio signal in each of the channels obtained after the D/A conversion by said DAC part, any component equal to or lower than a cutoff frequency which is assigned in accordance with a sampling frequency of each of the audio signals, and output the same as an analog audio signal for every channel;

wherein said decoding part includes sampling frequency converting circuit operable to execute sampling frequency conversion with respect to the audio data in at least one channel obtained by the decoding so that a sampling frequency thereof coincides with that of the other channels; and wherein said DAC part includes a digital to analog converter operable to convert, from digital to analog in a time sharing manner, the audio data in the plurality of channels equalized in sampling frequency through the sampling frequency conversion.

13. The multi-channel audio reproducing device according to claim 12, wherein said LPF part includes variable low-pass filters in as many numbers as the channels of the multi-channel audio data, to which the audio signal in each of the channels obtained after the D/A conversion by said DAC part is inputted, and which have variable filtering characteristics of passing only a component equal to or lower than a cutoff frequency assigned to each of the audio signals; and wherein said decoding part includes a control circuit for controlling the variable filtering characteristics of each of said variable low-pass filters in relation to the sampling frequency conversion.

14. The multi-channel audio reproducing device according to claim 12, wherein said LPF part includes low-pass filters in as many numbers as the channels of the multi-channel audio data, to which the audio signal of each of the channels obtained after the D/A conversion by said DAC part is inputted, and which have unchanging filtering characteristics of passing only a component equal to or lower than the cutoff frequency assigned to each of the audio signals.

15. The multi-channel audio reproducing device according to claim 12, wherein said sampling frequency converting circuit is operable to execute the sampling frequency conversion by interpolation when the sampling frequency is over-sampled, and by decimation when down-sampled.

16. A DVD audio reproducing device for reproducing multi-channel audio data, recorded on a DVD, obtained by encoding audio data in a plurality of channels sampled at different sampling frequencies, said DVD audio reproducing device comprising:

a reading part operable to read out,the multi-channel audio data from the DVD;

a decoding part operable to decode the multi-channel audio data read by said reading part;

a DAC part operable to convert, from digital to analog, the audio data in each of the channels obtained after the decoding by said DAC part; and an LPF part operable to extract, from an audio signal in each of the channels obtained after the D/A conversion by said DAC part, any component equal to or lower than a cutoff frequency assigned in accordance with a sampling frequency of each of the audio signals, and output the same in a form of an analog audio signal for every channel;

wherein said decoding part includes a sampling frequency converting circuit operable to execute sampling frequency conversion with respect to the audio data in at least one channel obtained by the decoding so that a sampling frequency thereof coincides with that of the other channels; and said DAC part includes a digital to analog converter operable to convert, from digital to analog in a time sharing manner, audio data in the plurality of channels equalized in sampling frequency through the sampling frequency conversion.

17. A DVD audio reproducing device for reproducing six-channel audio data, recorded on a DVD, obtained by encoding audio data in six channels sampled at different sampling frequencies, said DVD audio reproducing device comprising:

a reading part operable to read out the six-channel audio data from the DVD;

a decoding part operable to decode the six-channel audio data read from said reading part;

a DAC part operable to convert, from digital to analog, the audio data in each of the channels obtained after the decoding by said decoding part; and an LPF part operable to extract, from an audio signal in each of the channels obtained after the D/A conversion by said DAC part, any component equal to or lower than a cutoff frequency assigned in accordance with a sampling frequency of each of the audio signals, and output the same in a form of an analog audio signal for every channel;

wherein said decoding part includes sampling frequency converting circuit operable to execute sampling frequency conversion with respect to the audio data in three channels obtained by the decoding so that each sampling frequency thereof coincides with that of three other channels; and said DAC part includes three digital to analog converters operable to convert, from digital to analog in a time sharing manner, the audio data in three channels equalized in sampling frequency through the sampling frequency conversion.

18. The DVD audio reproducing device according to claim 17, wherein said LPF part includes six variable low-pass filters, to which the audio signal in each of the channels obtained after the D/A conversion by said DAC part is inputted, and which have variable filtering characteristics of passing only a component equal to or lower than a cutoff frequency assigned to each of the audio signals; and wherein said decoding part, in relation to the sampling frequency conversion, includes a control circuit operable to control the variable filtering characteristics of each of said six variable low-pass filters.

19. The DVD audio reproducing device according to claim 17, wherein said LPF part includes six low-pass filters, to which the audio signal in each of the channels obtained after the D/A conversion by said DAC part is inputted, and which have unchanging filtering characteristics of passing only a component equal to or lower than the cutoff frequency assigned to each of the audio signals.

20. The DVD audio reproducing device according to claim 17, wherein said sampling frequency converting circuit executes the sampling frequency conversion by interpolation when the sampling frequency is over-sampled, and by decimation when the sampling frequency is down-sampled.

\* \* \* \* \*